United States Patent [19]

Bosen

[11] 4,166,493

[45] Sep. 4, 1979

[54] TIRE BEAD EXPANDER

[76] Inventor: Don B. Bosen, 166 Q St., Salt Lake City, Utah 84103

[21] Appl. No.: 862,742

[22] Filed: Dec. 21, 1977

Related U.S. Application Data

[63] Continuation of Ser. No. 707,354, Jul. 21, 1976, abandoned.

[51] Int. Cl.² ............................................. B60C 25/12
[52] U.S. Cl. .................................................. 157/1.21
[58] Field of Search ............................... 157/1.1, 1.21

[56] References Cited

U.S. PATENT DOCUMENTS

| | | | |
|---|---|---|---|
| 2,778,415 | 1/1957 | Murray | 157/1.21 |
| 2,968,343 | 1/1961 | McConkie | 157/1.21 |
| 3,973,615 | 8/1976 | Cunha | 157/1.21 |

Primary Examiner—James L. Jones, Jr.
Assistant Examiner—James G. Smith
Attorney, Agent, or Firm—B. Deon Criddle

[57] ABSTRACT

Apparatus for expanding the beads on tubeless tires, including a stand into which such a tire is to be rolled, a flexible draw strap adapted to peripherally surround the tire or to cooperate with an arcuate central frame in surrounding the tire, cinching apparatus for substantially uniformly tightening the draw strap around the tire, and valving structure through which compressed air may be supplied to tire inflation apparatus.

5 Claims, 9 Drawing Figures

TIRE BEAD EXPANDER

This is a continuation of application Serial No. 707,354, filed July 21, 1976 now abandoned.

BRIEF DESCRIPTION OF THE INVENTION

1. Field of the Invention

This invention relates to apparatus used in the expanding of the beads of a tubeless tire such that they will properly seat against a wheel rim and provide leak proof seals as the tire is inflated.

2. Prior Art

With the advent of tubeless tires, it has been necessary to develop apparatus for properly positioning the beads of the tires so that they will seat against wheel rims on which they are mounted as the tires are inflated. The apparatus used has generally comprised a belt that can be placed peripherally around a tire after the tire has been mounted on a wheel, and that includes some means for tightening the belt to increase the peripheral pressure applied to the tire. This increased peripheral pressure, and the constraint of the belt, force the sidewalls of the tire outwardly such that the beads thereof will engage the wheel rims. The belts generally have cinching devices to shorten the belt length and thereby increase the constraint applied by the belt to the periphery of the tire, or they are inflatable such that as air is put into the belts, and they expand, they apply additional constraint to the tire. In using such devices, it is most common for the tire to be lifted into a horizontal position where the weight of the wheel generally moves the rims thereof away from the beads of the tire that are to be sealed to the rims. As a result, it is frequently very difficult to seal the beads to the rims.

SUMMARY OF THE INVENTION

The present invention is concerned with providing apparatus for expanding tire beads into engagement with wheel rims in such a way that the tire beads are more easily seated against the wheel rims than has heretofore been possible and without involving any difficult lifting or handling of a wheel assembly comprising the wheel and a tire mounted thereon.

Principal objects of the present invention are to provide apparatus that can be conveniently used with tubeless tires of all sizes, even including large truck tires; and of all kinds, including belted bias and radial tires; and that can be used to quickly and easily seat the beads of the tires against the rims of wheels during inflation of the tires.

Other objects are to provide such apparatus on which a wheel assembly can be readily positioned without lifting and that will insure proper initial seating of the tire beads of the tire of the wheel assembly against the rims of the wheel of the wheel assembly as the tire is inflated.

Principal features of the invention include a stand or framework onto which a wheel assembly may be rolled and including guide means that will support the wheel assembly in an upright position; a draw strap that extends fully around or that cooperates with a frame member to totally encircle the periphery of the tire of the wheel assembly; cinching apparatus for snugging the draw strap tight around the periphery of the tire; and valve apparatus that provides compressed air to a tire inflation apparatus.

Additional objects and features of the invention will become apparent from the following detailed description, taken together with the accompanying drawings.

THE DRAWINGS

In the drawings:

FIG. 1 is a perspective view of a first embodiment of the invention, showing a wheel assembly including a tire mounted on a wheel and positioned within the tire bead expander of the invention;

FIG. 2, a vertical section view taken on the line 2—2 of FIG. 1, with the cinching means surrounding the tire, but not snugged up tight;

FIG. 3, a view like that of FIG. 2, but showing the cinching means cinched tight and the tire deformed accordingly;

FIG. 4, a side elevation view of the apparatus without a wheel assembly positioned therein;

FIG. 5, a front elevation view;

FIG. 6, a front elevation view of another embodiment of the invention;

FIG. 7, a side elevation view of the embodiment of the invention shown in FIG. 6;

FIG. 8, a similar view, with a tire positioned therein, but with the draw strap not cinched tight; and FIG. 9, another such view with the draw strap cinched tight.

DETAILED DESCRIPTION

Figure 1:
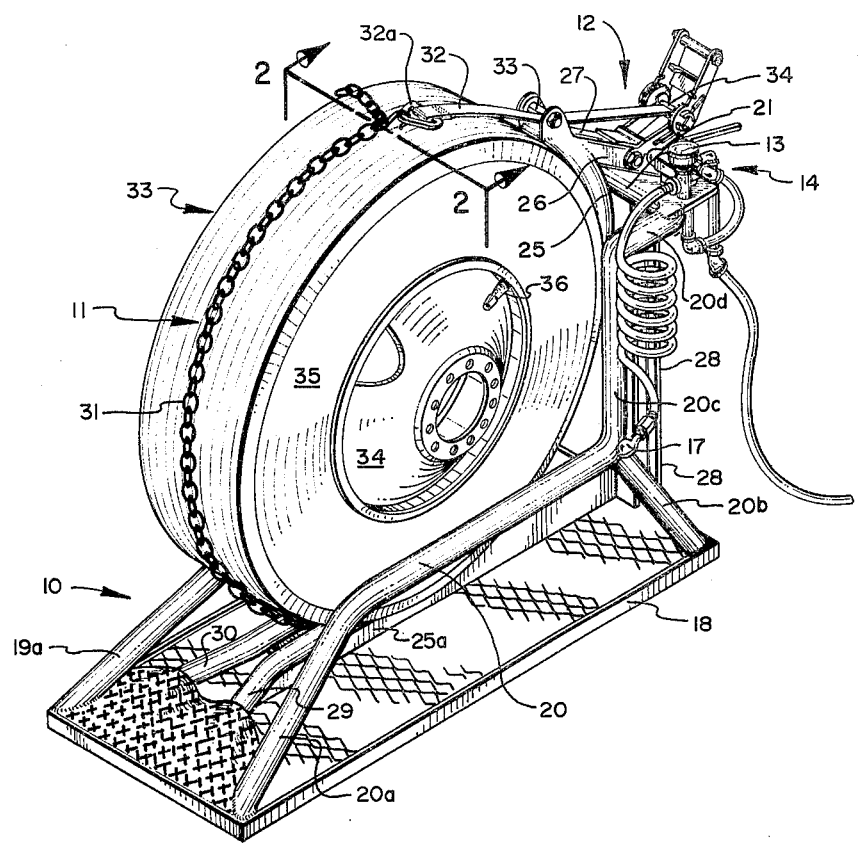
Figure 2:
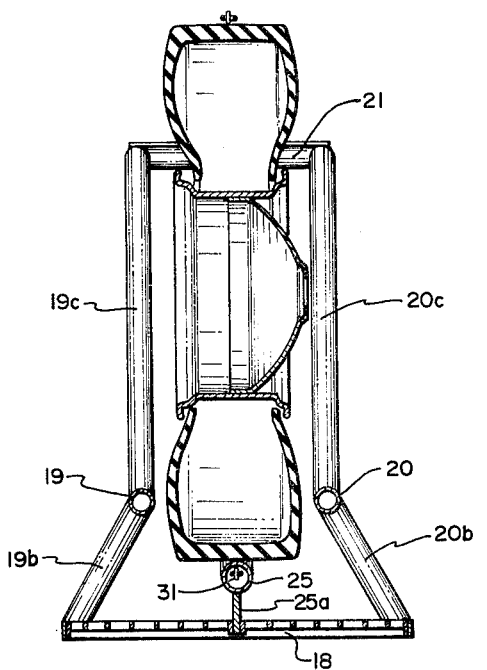
Figure 3:
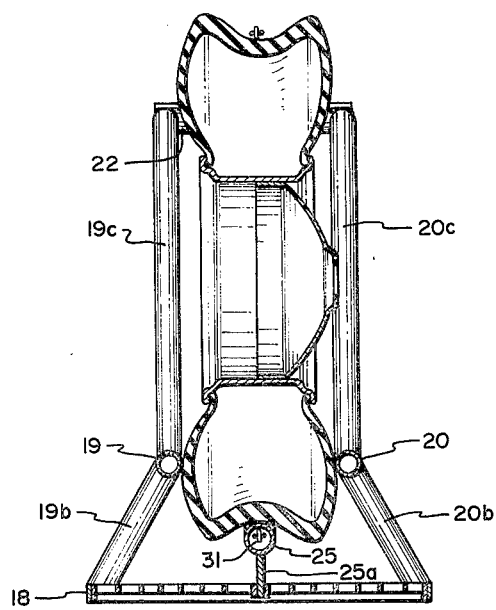
Figures 4, 5:
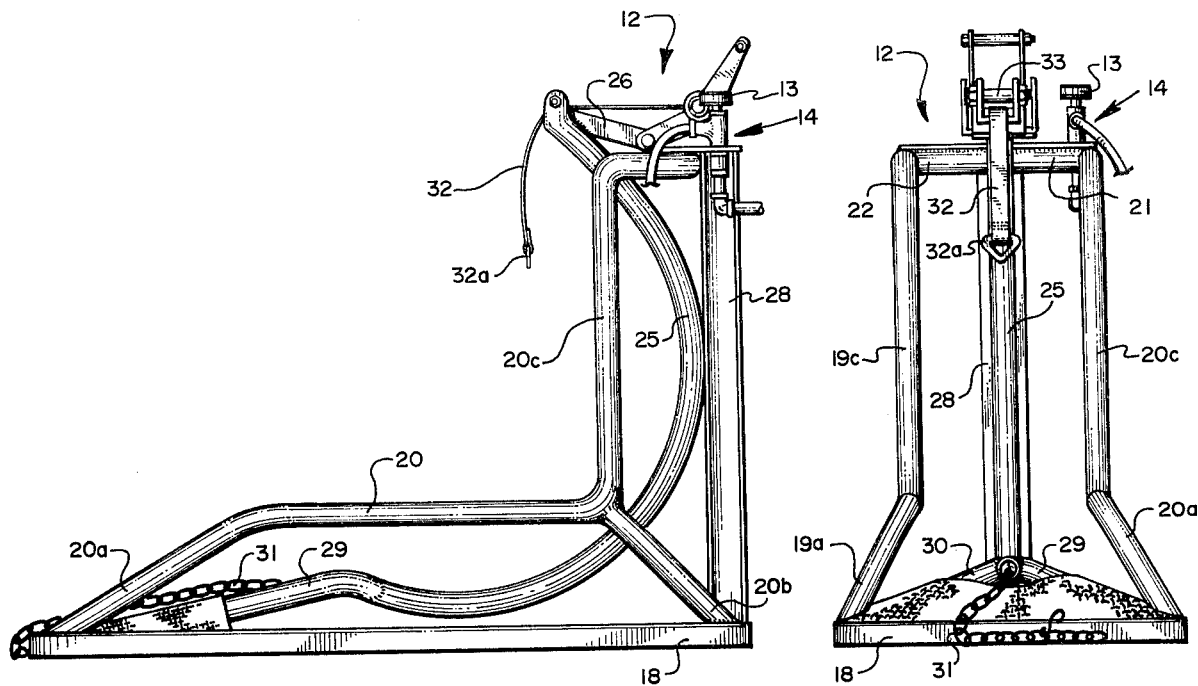
Figure 6:
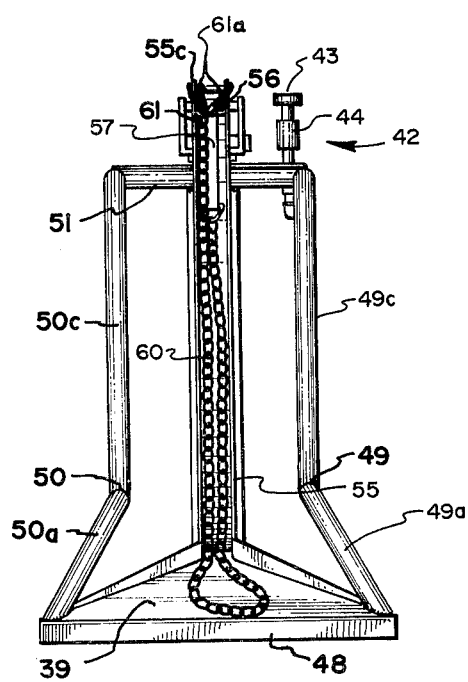
Figure 7:
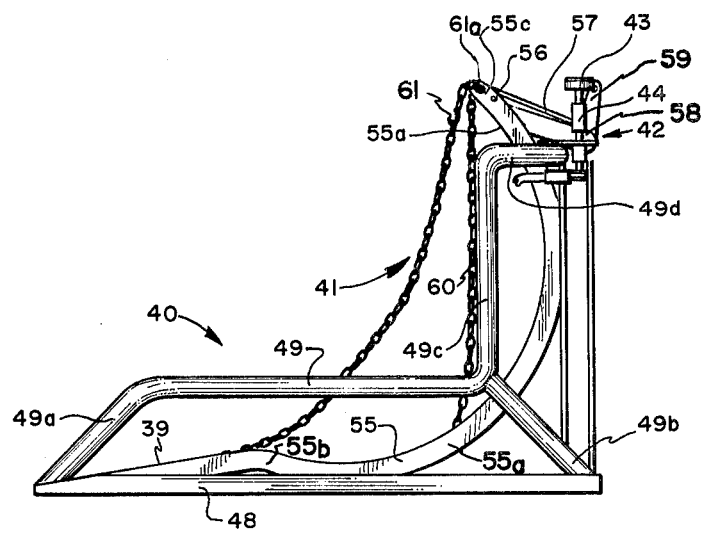
Figure 8:
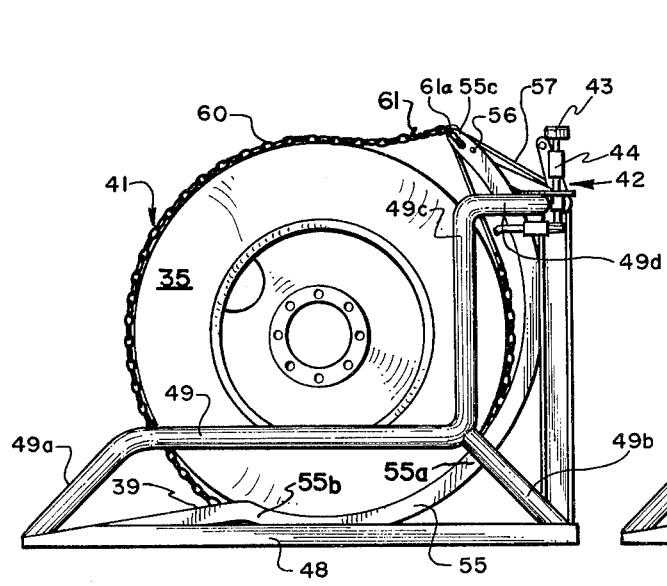

Referring now to the drawings:

In the illustrated embodiment shown in FIGS. 1–3, the tire bead expander of the present invention comprises a stand and support frame, shown generally at 10; a draw strap, shown generally at 11; a ratchet take up unit 12; a pressure gauge 13; and a control valve 14.

Valve 14 has an inlet line 15 connected thereto and the other end of the inlet line is connected to an air compressor or other source of air under pressure, not shown. An air hose 16 also has one end connected to the valve 14 and its other end has an inflation fitting 17 thereon.

The stand and support frame 10 includes a base platform 18. Side rails 19 and 20 are spaced apart at opposite sides of the platform 18 to serve as guides for a wheel assembly, such as is shown at 11, FIG. 1, to be rolled therebetween. The side rails 19 and 20 include outwardly flared front legs 19a and 20a that extend to the forward end of platform 18 and rear legs 19b and 20b. The side rails extend upwardly at 19c and 20c and rearwardly at 19d and 20d before being interconnected by a cross bar 21. The outwardly flared front legs serve to guide the wheel assembly between the rails and the spacing of the rails is such that the wheel assembly can be readily rolled between them until the wheel assembly comes in contact with the cross bar 21 or is stopped by pipe 25.

Pipe 25 is held positioned above the platform 18 by bar 25a and is located centrally between the side rails 19 and 20 to serve as a central tire support. The pipe 25 is arcuately curved to fit around a tire periphery. Pipe 25 is supported at its upper end by a pair of brackets 26 and 27 that are fixed to the cross bar 21 and an upright stanchion 28 that is mounted on the base platform, and at its lower end by a pair of guide pipes 29 and 30 that extend forwardly and outwardly from the pipe 25 to the base platform 18.

The flexible draw strap 11 is attached to the uppper and lower ends of the pipe 25. The draw strap includes a chain 31 that has one end fixed at 31a within the lower end of pipe 25 and a flexible strap 32 that has one end passed between guide rollers 33 and that is then secured to a take up reel 34 of the ratchet take up unit 12. The other end of the chain 31 is fixed to the other end of the flexible strap 32 by a connector 32a. The ratchet take up unit 12 is conventional and is used to take up the slack and to tighten the draw strap 11 around the tire of a wheel assembly positioned on the support frame 10.

In use, a wheel assembly such as is shown at 33, and including a wheel 34 on which a tubeless tire 35 has been mounted, is rolled into position on the frame 10. In positioning the wheel assembly, it is rolled between the front legs 19a and 20a and the side rails 19 and 20 until it is stopped by the pipe 25 or the cross bar 21. As the wheel assembly is rolled between the guide rails it is directed up the guide pipes 29 and 30 and rests on the lower portion of pipe 25 and partially within the curve of the pipe 25.

After the wheel assembly has been positioned, the draw strap 11, which has been moved from between the side rails during positioning of the wheel assembly, is arranged to peripherally encircle the portion of the tire not within the curve of pipe 25. The ratchet take up unit is then manipulated to roll the flexible strap 32 thereon and to thereby tighten the chain and strap 32 around a portion of the tire, while at the same time compressing the tire against pipe 25. The chain 31 extends from within pipe 25 at one end and below the tire supporting surface of the central tire support and since the strap is taken up by the ratchet at the other end of the pipe 25, the tire is substantially fully encircled by the pipe 25 and draw strap 11, and, as the strap 32 is rolled onto the ratchet take up unit reel, the tire is substantially uniformly compressed around its entire periphery. This expands the tire bead outwardly into close proximity with the rims of the wheel. Thereafter air is forced into the tire through the usual valve stem 36, using the inflation fitting 17 and air hose 16.

In the embodiment of the invention shown in FIGS. 6–9, the tire bead expander comprises a support frame, shown generally at 40; a draw strap, shown generally at 41; a ratchet take up unit 42 that corresponds to the ratchet take up unit 12 previously described; and a pressure gauge 43 and control valve 44 that correspond to the pressure gauge 13 and control valve 14, previously described.

The connections and operations of the gauge 43 and control valve 44 are the same as for gauge 13 and valve 14, previously described and will not be further described in detail.

Frame 40 includes a base platform 48, spaced apart side rails 49 and 50 will outwardly and downwardly extending front legs 49a and 50a. A guide plate 39 extends between the front legs and partially up the legs to guide a wheel assembly 11 upwardly between the side rails, as will be further explained. Rear legs 49b and 50b extend outwardly and rearwardly from the side rails to support them above the base platform 48.

The side rails 49 and 50 extend upwardly at 49c and 50c and rearwardly at 49d and 50d before being interconnected by a cross bar 51.

An upwardly opening channel member 55, positioned above the platform 48 and centrally between the side rails is arcuately curved at 55a to generally follow a portion of the periphery of a tire and extends at its lower end 55b to a location just behind the upper end of the guide plate 39. The channel member thus serves as a central tire support means.

The side flanges of the channel member 55 extend upwardly at 55c beyond the upper end of the channel web and rollers 56 are positioned between the side flanges to guide a belt portion 57 of the draw strap 41 therethrough. One end of the belt portion 57 is connected to the ratchet take up unit 58 and is adapted to be rolled thereon in conventional fashion by pivoting of the handle 59. The other end of the belt portion is securely attached to a chain portion 60 of the draw strap 41. The chain portion 60 is long enough to encircle, with the belt, the tire of any wheel assembly positioned in the tire bead expander. A hook 61 is centrally attached to a short chain 61a, the ends of which are anchored to the upper side flanges of the channel member 55.

In using the tire bead expander of FIGS. 6–9, the draw strap is arranged such that the belt portion hangs downwardly and the chain portion 60 is positioned in the channel member 55, before being draped to one side of the unit. A wheel assembly, with a tire 35 mounted thereon, is rolled up the guide plate 39 and onto the lower end of the channel member. The draw strap is then positioned around the tire periphery, is pulled up as much as possible and the chain portion 60 is connected to the hook 61. Thereafter, the ratchet take up unit 58 is operated to take up the belt portion 57. This pulls the draw strap even more tightly around the tire and expands the tire beads outwardly where they will be more apt to seat against the rims of the wheel 33 of the wheel assembly.

Figure 9:
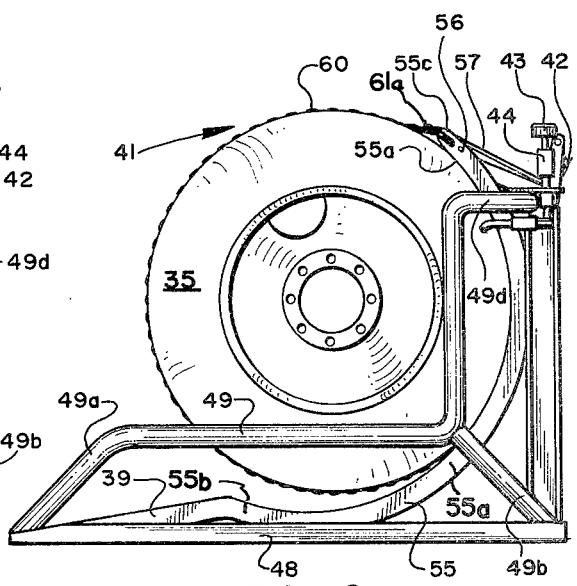

As the draw strap tightens around the tire, the wheel assembly is raised and the draw strap comes out of channel, as shown best in FIG. 9. The draw strap then applies a substantially uniform pressure fully around the tire as the tire beads are expanded outwardly to facilitate their sealing with the rims of the wheel.

While the cinching apparatus herein disclosed comprises a manually manipulated, ratchet operated take up unit, it will be apparent that other types of take up units can be used. For example, such unit can be fluid or electrically operated.

Although preferred forms of my invention have been herein disclosed, it is to be understood that the present disclosure is by of example and that variations are possible without departing from the subject matter coming within the scope of the following claims, which subject matter I regard as my invention.

I claim:

1. A tire bead expander comprising a stand;
   guide means on the stand including spaced apart side members between which a wheel assembly comprising a wheel having a tire mounted thereon is rolled and held in a vertical position, said guide means further including a central tire support with side edges on which the tire is adapted to be supported and a space therebetween extending from a ramp portion at a front of the stand rearwardly and upwardly in arcuate configuration to receive the wheel assembly;
   a flexible draw strap partially positioned in the space between the side edges on which the tire is adapted to be supported and being long enough to peripherally surround the tire;
   means to anchor one end of the draw strap to the stand; and means closely adjacent the said one end of the strap for taking up the other end of the draw strap to thereby substantially uniformly tighten the draw strap around the tire.

2. A tire bead expander as in claim 1, wherein the central tire support forms a channel.

3. A tire bead expander as in claim 2, wherein the draw strap has one end fixed to the upper end of the central tire support, and a portion of the draw strap is adapted to rest in the channel of the central tire support as a wheel assembly is rolled onto the central tire support.

4. A tire bead expander as in claim 3, wherein the means for taking up the other end of the draw strap comprises a ratchet operated roller.

5. A tire bead expander as in claim 4, further including
an air pressure gauge on the stand;
a valve on the stand; and
means for supplying air under pressure through the gauge and the valve to a tire positioned on the stand.